United States Patent
Duesel, Jr. et al.

(10) Patent No.: US 9,366,479 B2
(45) Date of Patent: Jun. 14, 2016

(54) CONDENSATION PLUME MITIGATION SYSTEM FOR EXHAUST STACKS

(71) Applicant: HEARTLAND TECHNOLOGY PARTNERS LLC, St Louis, MO (US)

(72) Inventors: Bernard F. Duesel, Jr., Goshen, NY (US); Michael J. Rutsch, Pittsburgh, PA (US); Craig Clerkin, Stoughton, WI (US)

(73) Assignee: HEARTLAND TECHNOLOGY PARTNERS LLC, St. Louis, MO (US)

( * ) Notice: Subject to any disclaimer, the term of this patent is extended or adjusted under 35 U.S.C. 154(b) by 0 days.

(21) Appl. No.: 14/182,090

(22) Filed: Feb. 17, 2014

(65) Prior Publication Data

US 2014/0159259 A1 Jun. 12, 2014

Related U.S. Application Data

(62) Division of application No. 13/354,064, filed on Jan. 19, 2012, now Pat. No. 8,721,771.

(60) Provisional application No. 61/435,134, filed on Jan. 21, 2011.

(51) Int. Cl.

| | |
|---|---|
| *B01D 45/12* | (2006.01) |
| *F28C 1/00* | (2006.01) |
| *B01D 45/08* | (2006.01) |
| *B01D 1/14* | (2006.01) |
| *B01D 5/00* | (2006.01) |
| *C02F 1/04* | (2006.01) |
| *C02F 1/16* | (2006.01) |
| *B01D 37/00* | (2006.01) |
| *B01D 29/00* | (2006.01) |
| *F23J 15/02* | (2006.01) |
| *F23C 9/08* | (2006.01) |
| *B01D 53/34* | (2006.01) |

(52) U.S. Cl.
CPC ... *F28C 1/00* (2013.01); *B01D 1/14* (2013.01); *B01D 5/0027* (2013.01); *B01D 45/08* (2013.01); *C02F 1/048* (2013.01); *C02F 1/16* (2013.01); *B01D 29/00* (2013.01); *B01D 37/00* (2013.01); *B01D 53/343* (2013.01); *B01D 2258/01* (2013.01); *B01D 2258/0283* (2013.01); *F23C 9/08* (2013.01); *F23J 15/02* (2013.01); *Y02C 20/20* (2013.01)

(58) Field of Classification Search
CPC ........ B01D 37/00; B01D 29/00; B01D 45/08; B01D 5/0027; B01D 1/14; B01D 53/343; B01D 2258/01; B01D 2258/0283; F23J 15/02; F23C 9/08; F28C 1/00; C02F 1/048; C02F 1/16; Y02C 20/20
USPC ................... 95/272, 158, 226, 224, 288, 267; 55/309, 309.1, 434.2; 159/16.2, 29, 44, 159/46, 47.3; 210/767, 919; 110/203, 215, 110/216, 345
See application file for complete search history.

(56) References Cited

U.S. PATENT DOCUMENTS

3,525,309 A * 8/1970 Katz .............................. 110/215

*Primary Examiner* — Dung H Bui
(74) *Attorney, Agent, or Firm* — Marshall, Gerstein & Borun LLP (57) ABSTRACT

An exhaust gas plume mitigation process and system includes either mixing secondary heat into a moisture rich exhaust gas stream, or diverting a moisture rich exhaust gas stream into a primary exhaust stack having hot exhaust gases flowing therethrough. Moisture rich exhaust gas from a liquid concentrator may be diverted into a high temperature exhaust stack of an engine, a generator, or a flare. The high temperature exhaust gases from the engine, the generator, or the flare raise the temperature of the moisture rich exhaust gas from the concentrator. The high temperature exhaust gases from the engine, the generator, or the flare are also lower in moisture content, so that the moisture rich exhaust gas from the concentrator is diluted by the drier high temperature exhaust gas. As a result, the mixed gas is less likely to develop a moisture plume upon exit to the atmosphere.

13 Claims, 10 Drawing Sheets

CONDENSATION PLUME MITIGATION SYSTEM FOR EXHAUST STACKS

RELATED APPLICATIONS

This application is a divisional application of U.S. patent application Ser. No. 13/354,064, filed Jan. 19, 2012, which is a non-provisional application that claimed priority benefit of U.S. Provisional Patent Application No. 61/435,134, filed Jan. 21, 2011. U.S. Non-Provisional patent application Ser. No. 13/354,064 and Provisional Patent Application No. 61/435,134 are hereby incorporated by reference herein.

FIELD OF THE DISCLOSURE

This application relates generally to exhaust gas plume mitigation systems and more particularly to exhaust gas condensation plume mitigation systems that use waste heat from an engine or generator exhaust stack.

BACKGROUND

Exhaust gas is a byproduct of fuel combustion. Often times exhaust gas is vented to the atmosphere via an exhaust stack. Factories, for example, may have one or more tall exhaust stacks to vent exhaust gas to the atmosphere. The exhaust gas is typically at a relatively high temperature when released and includes a certain amount of moisture and other chemicals that may condense when cooled. As the exhaust gas mixes with cooler atmospheric gases, when exiting the exhaust stack, the exhaust gas cools, reaching an equilibrium temperature with the atmosphere. When the exhaust gas cools often it will sink below a saturation temperature for the moisture or other chemicals. When a saturation temperature is reached, the moisture or other chemicals begin to condense, often forming plumes or clouds. These plumes or clouds are often perceived by the local population as pollution or smoke, even when the plume or cloud is made up almost entirely of water vapor. As a result, minimizing plume formation from exhaust stacks may be desirable to reduce a perception that the exhaust stack is polluting the local atmosphere.

Certain types of industrial operations are more likely to produce exhaust moisture plumes, for example, fluid or wastewater concentration/evaporation operations. In one example, concentrating landfill leachate may include evaporating or vaporizing a liquid portion of the leachate to reduce the overall volume of the leachate. As a result, a landfill operator is left with a lower volume of leachate that requires disposal. Because a large volume of liquid is evaporated in the concentrating process, exhaust gases from such concentrating operations include a large percentage of moisture or water vapor, which may approach the saturation point of the exhaust gas as the exhaust gas cools upon exiting to the atmosphere. In such concentrating operations, when the saturated exhaust gas exits an exhaust stack and enters the atmosphere, the moisture almost immediately begins to condense, forming moisture plumes. Other evaporation processes, such as the process of evaporating water in a cooling tower, also may produce moisture plumes when gas exits to the atmosphere.

SUMMARY

An exhaust gas plume mitigation process and system includes either injecting secondary heat into a moisture rich exhaust gas stream, or diverting a moisture rich exhaust gas stream into a primary exhaust stack. More particularly, moisture rich exhaust gas from a liquid concentrator may be mixed with a high temperature exhaust stack of an engine or generator. The high temperature exhaust gases from the engine or generator raise the temperature of the moisture rich exhaust gas from the concentrator. The high temperature exhaust gases from the engine or generator are also lower in moisture content, so that the moisture rich exhaust gas from the concentrator is diluted by the drier high temperature exhaust gas. As a result, the mixed gas exiting the high temperature exhaust stack of the engine or generator is less likely to develop a condensation plume.

DETAILED DESCRIPTION

Figure 1:
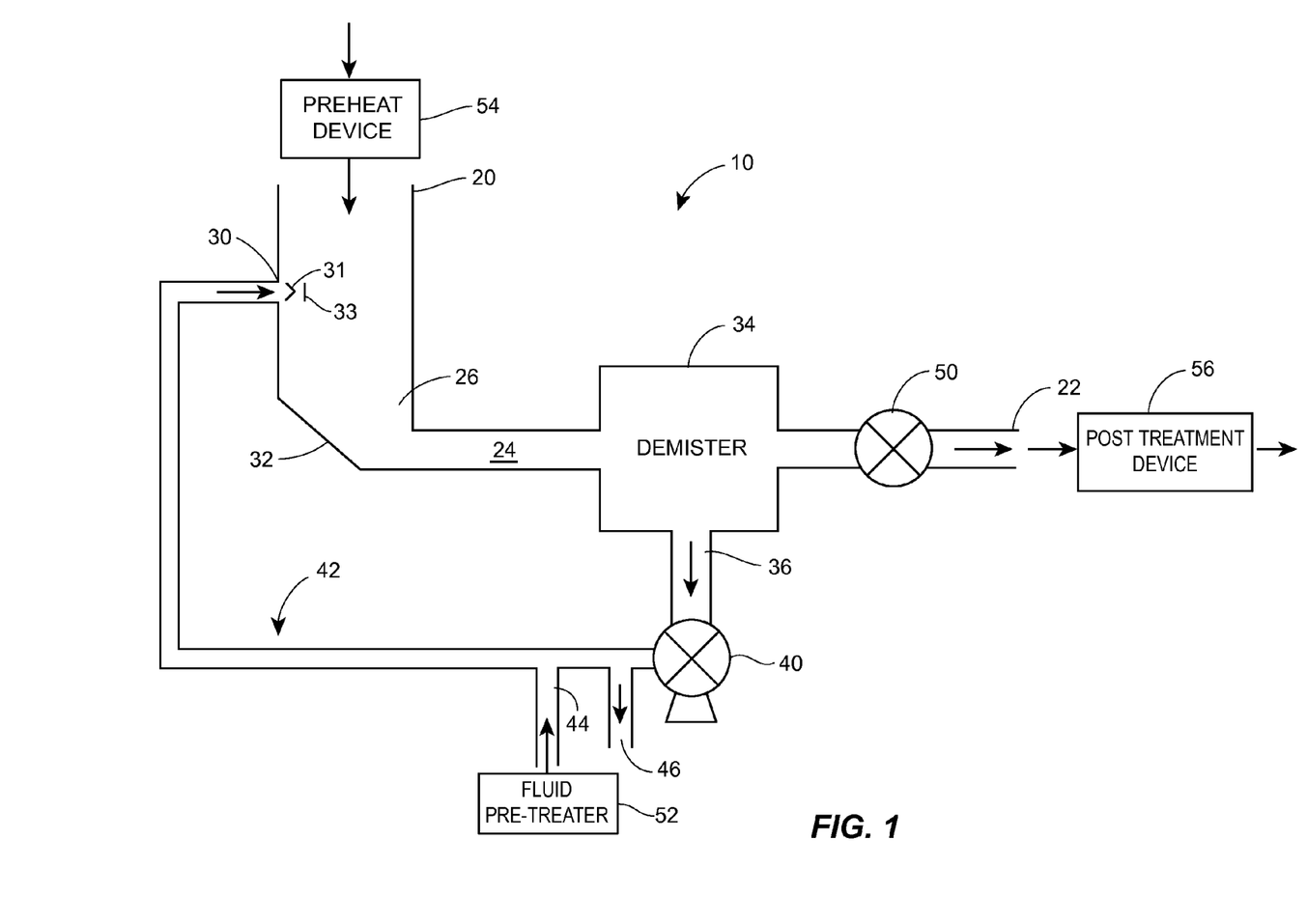
FIG. 1 is a general schematic diagram of a compact liquid concentrator.

FIG. 1 illustrates a generalized schematic diagram of a liquid concentrator 10 that may be used to concentrate wastewater, such as landfill leachate. The liquid concentrator 10 may include a gas inlet 20, a gas exit 22, and a flow corridor 24 connecting the gas inlet 20 to the gas exit 22. The flow corridor 24 may include a narrowed portion 26 that accelerates gas flow through the flow corridor 24, thereby creating turbulent flow within the flow corridor 24 at or near the narrowed portion 26. The narrowed portion 26 in this embodiment may formed by a venturi device. A liquid inlet 30 injects a liquid to be concentrated (via evaporation) into a liquid concentration chamber in the flow corridor 24 at a point upstream of the narrowed portion 26, and the injected liquid joins with the gas flow in the flow corridor 24. The liquid inlet 30 may include one or more replaceable nozzles 31 for spraying the liquid into the flow corridor 24. The inlet 30, whether or not equipped with a nozzle 31, may introduce the liquid in any direction from perpendicular to parallel to the gas flow as the gas moves through the flow corridor 24. A baffle 33 may also be located near the liquid inlet 30 such that liquid introduced from the liquid inlet 30 impinges on the baffle and disperses into the flow corridor in small droplets.

As the gas and liquid flow through the narrowed portion 26, the venturi principle creates an accelerated and turbulent flow that thoroughly mixes the gas and liquid in the flow corridor 24 at and after the location of the inlet 30. This acceleration through the narrowed portion 26 creates shearing forces between the gas flow and the liquid droplets, and between the liquid droplets and the walls of the narrowed portion 26, resulting in the formation of very fine liquid droplets entrained in the gas, thus increasing the interfacial surface area between the liquid droplets and the gas and effecting rapid mass and heat transfer between the gas and the liquid droplets. The liquid exits the narrowed portion 26 as very fine droplets regardless of the geometric shape of the liquid flowing into the narrowed portion 26 (e.g., the liquid may flow into the narrowed portion 26 as a sheet of liquid). As a result of the turbulent mixing and shearing forces, a portion of the liquid rapidly vaporizes and becomes part of the gas stream. As the gas-liquid mixture moves through the narrowed portion 26, the direction and/or velocity of the gas/liquid mixture may be changed by an adjustable flow restriction, such as a venturi plate 32, which is generally used to create a large pressure difference in the flow corridor 24 upstream and downstream of the venturi plate 32. The venturi plate 32 may be adjustable to control the size and/or shape of the narrowed portion 26 and may be manufactured from a corrosion resistant material including a high alloy metal such as those manufactured under the trade names of Hastelloy®, Inconel® and Monel®.

After leaving the narrowed portion 26, the gas-liquid mixture passes through a demister 34 (also referred to as fluid scrubbers or entrainment separators) coupled to the gas exit 22. The demister 34 removes entrained liquid droplets from the gas stream. The demister 34 includes a gas-flow passage. The removed liquid collects in a liquid collector or sump 36 in the gas-flow passage, the sump 36 may also include a reservoir for holding the removed liquid. A pump 40 fluidly coupled to the sump 36 and/or reservoir moves the liquid through a re-circulating circuit 42 back to the liquid inlet 30 and/or flow corridor 24. In this manner, the liquid may be reduced through evaporation to a desired concentration. Fresh or new liquid to be concentrated is input to the re-circulating circuit 42 through a liquid inlet 44. This new liquid may instead be injected directly into the flow corridor 24 upstream of the venturi plate 32. The rate of fresh liquid input into the re-circulating circuit 42 may be equal to the rate of evaporation of the liquid as the gas-liquid mixture flows through the flow corridor 24 plus the rate of liquid extracted through a concentrated fluid extraction port 46 located in or near the reservoir in the sump 40. The ratio of re-circulated liquid to fresh liquid may generally be in the range of approximately 1:1 to approximately 100:1, and is usually in the range of approximately 5:1 to approximately 25:1. For example, if the re-circulating circuit 42 circulates fluid at approximately 10 gal/min, fresh or new liquid may be introduced at a rate of approximately 1 gal/min (i.e., a 10:1 ratio). A portion of the liquid may be drawn off through the extraction port 46 when the liquid in the re-circulating circuit 42 reaches a desired concentration. The re-circulating circuit 42 acts as a buffer or shock absorber for the evaporation process ensuring that enough moisture is present in the flow corridor 24 to prevent the liquid from being completely evaporated and/or preventing the formation of dry particulate.

After passing through the demister 34 the gas stream passes through an induction fan 50 that draws the gas through the flow corridor 24 and demister gas-flow corridor under negative pressure. Of course, the concentrator 10 could operate under positive pressure produced by a blower (not shown) prior to the liquid inlet 30. Finally, the gas is vented to the atmosphere or directed for further processing through the gas exit 22.

The concentrator 10 may include a pre-treatment system 52 for treating the liquid to be concentrated, which may be a wastewater feed. For example, an air stripper may be used as a pre-treatment system 52 to remove substances that may produce foul odors or be regulated as air pollutants. In this case, the air stripper may be any conventional type of air stripper or may be a further concentrator of the type described herein, which may be used in series as the air stripper. The pre-treatment system 52 may, if desired, heat the liquid to be concentrated using any desired heating technique. Additionally, the gas and/or wastewater feed circulating through the concentrator 10 may be pre-heated in a pre-heater 54. Pre-heating may be used to enhance the rate of evaporation and thus the rate of concentration of the liquid. The gas and/or wastewater feed may be pre-heated through combustion of renewable fuels such as wood chips, bio-gas, methane, or any other type of renewable fuel or any combination of renewable fuels, fossil fuels and waste heat. Furthermore, the gas and/or wastewater may be pre-heated through the use of waste heat generated in a landfill flare or stack. Also, waste heat from an engine, such as an internal combustion engine, may be used to pre-heat the gas and/or wastewater feed. Still further, natural gas may be used as a source of waste heat, the natural gas may be supplied directly from a natural gas well head in an unrefined condition either immediately after completion of the natural gas well before the gas flow has stabilized or after the gas flow has stabilized in a more steady state natural gas well. Optionally, the natural gas may be refined before being combusted in the flare. Additionally, the gas streams ejected from the gas exit 22 of the concentrator 10 may be transferred into a flare or other post treatment device 56 which treats the gas before releasing the gas to the atmosphere.

The liquid concentrator 10 described herein may be used to concentrate a wide variety of wastewater streams, such as waste water from industry, runoff water from natural disasters (floods, hurricanes), refinery caustic, leachate such as landfill leachate, flowback water from completion of natural gas wells, produced water from operation of natural gas wells, etc. The liquid concentrator 10 is practical, energy efficient, reliable, and cost-effective. In order to increase the utility of this liquid concentrator, the liquid concentrator 10 is readily adaptable to being mounted on a trailer or a moveable skid to effectively deal with wastewater streams that arise as the result of accidents or natural disasters or to routinely treat wastewater that is generated at spatially separated or remote sites. The liquid concentrator 10 described herein has all of these desirable characteristics and provides significant advantages over conventional wastewater concentrators, especially when the goal is to manage a broad variety of wastewater streams.

Due to the temperature difference between the gas and liquid, the relatively small volume of liquid contained within the system, the relatively large interfacial area between the liquid and the gas, and the reduced relative humidity of the gas prior to mixing with the liquid, the concentrator 10 approaches the adiabatic saturation temperature for the particular gas/liquid mixture, which is typically in the range of about 150 degrees Fahrenheit to about 215 degrees Fahrenheit (i.e., this concentrator is a "low momentum" concentrator). Additionally, the concentrator may be configured to operate on waste heat such as stack gases from engines (e.g., generators or vehicle engines), turbines, industrial process stacks, gas compressor systems, and flares, such as landfill gas flares.

Figure 2:
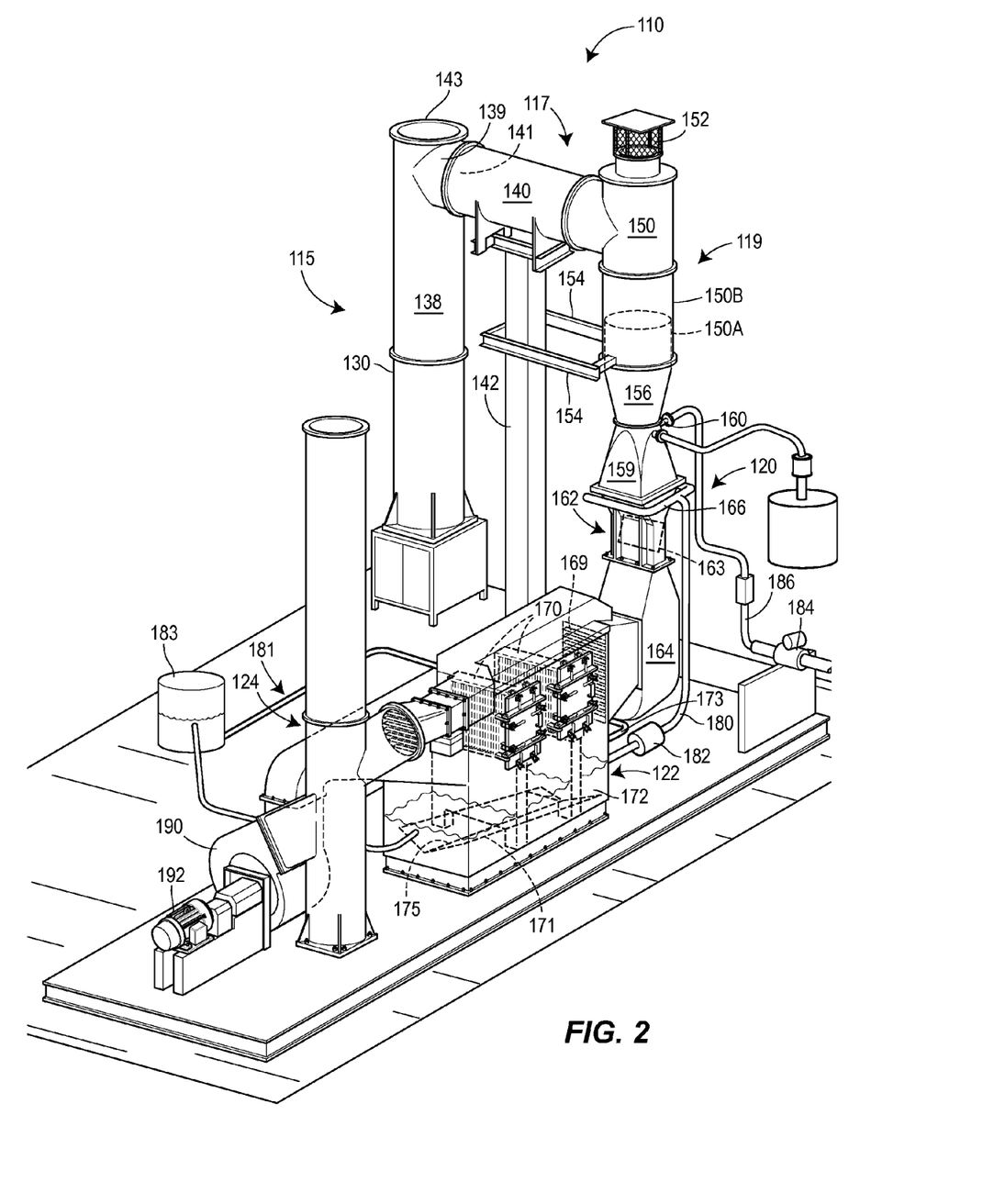
FIG. 2 is a perspective view of a compact liquid concentrator which implements the concentration process illustrated in FIG. 1, connected to a source of waste heat produced by a landfill flare.

FIG. 2 illustrates one particular embodiment of a compact liquid concentrator 110 which operates using the principles described above with respect to FIG. 1 and which is connected to a source of waste heat in the form of a landfill flare. Generally speaking, the compact liquid concentrator 110 of FIG. 2 operates to concentrate wastewater, such as landfill leachate, using exhaust or waste heat created within a landfill flare which burns landfill gas in a manner that meets the standards set by the U.S. Environmental Protection Agency (EPA) and/or more local regulatory authority. As is known, most landfills include a flare which is used to burn landfill gas to eliminate methane and other gases prior to release to the atmosphere. Typically, the gas exiting the flare is between 1200 and 1500 degrees Fahrenheit and may reach 1800 degrees Fahrenheit. The compact liquid concentrator 100 illustrated in FIG. 2 is equally effective in concentrating flowback or produced water from natural gas wells and may be operated on exhaust gas from a natural gas flare, or a propane flare, at or near the well head. The natural gas flare may be supplied with natural gas directly from the natural gas well, in some embodiments. In other embodiments, the concentrator 110 may be used to concentrate other types of wastewater, such as industrial waste water from oil refineries, runoff wastewater from natural disasters, such as floods and hurricanes, and virtually any other type of wastewater that needs concentration. Additionally, the concentrator 110 may use heat from virtually any heat source, such as engine or generator exhaust, landfill or natural gas flares, waste heat from industrial operations, etc.

As illustrated in FIG. 2, the compact liquid concentrator 110 generally includes or is connected to a flare assembly 115, and includes a heat transfer assembly 117, an air pre-treatment assembly 119, a concentrator assembly 120, a fluid scrubber 122, and an exhaust section 124. The flare assembly 115 includes a flare 130, which burns landfill gas (or other combustible fuel) therein according to any known principles.

If desired, the flare 130 may include an adapter section 138 including a primary combustion gas outlet 143 and a secondary combustion gas outlet 141 upstream of the primary combustion gas outlet 143. Combustion gas may be diverted through the secondary combustion gas outlet 141. The adapter section 138 may include a connector section 139 that connects the flare 130 (or exhaust stack) to the heat transfer section 117 using a 90 degree elbow or turn. Other connector arrangements are possible. For example, the flare 130 and heat transfer section 117 may be connected at virtually any angle between 0 degrees and 180 degrees.

As illustrated in FIG. 2, the heat transfer assembly 117 includes a transfer pipe 140, which connects to the secondary combustion gas outlet 141 and to an inlet of the air pre-treatment assembly 119. A support member 142, in the form of a vertical bar or pole, supports the heat transfer pipe 140 between the flare 130 and the air pre-treatment assembly 119 at a predetermined level or height above the ground. The heat transfer pipe 140 is connected to the connector section 139 or the adapter section 138 at the secondary combustion gas outlet 141, the transfer pipe 140 forming a portion of a fluid passageway between the adapter section 138 and a secondary process, such as a fluid concentrating process. The support member 142 is typically necessary because the heat transfer pipe 140 will generally be made of metal, such as carbon or stainless steel, and may be refractory lined with materials such as aluminum oxide and/or zirconium oxide, to withstand the temperature of the gas being transferred from the flare 130 to the air pre-treatment assembly 119. Thus, the heat transfer pipe 140 will typically be a heavy piece of equipment. However, because the flare 130, on the one hand, and the air pre-treatment assembly 119 and the concentrator assembly 120, on the other hand, are disposed immediately adjacent to one another, the heat transfer pipe 140 generally only needs to be of a relatively short length, thereby reducing the cost of the materials used in the concentrator 110, as well as reducing the amount of support structure needed to bear the weight of the heavy parts of the concentrator 110 above the ground. The heat transfer pipe 140 and the air pre-treatment assembly 119 form an upside-down U-shaped structure in this embodiment.

The air pre-treatment assembly 119 includes a vertical piping section 150 and an ambient air valve (not shown explicitly in FIG. 2) disposed at the top of the vertical piping section 150. The ambient air valve (also referred to as a damper or bleed valve) forms a fluid passageway between the heat transfer pipe 140 (or air pre-treatment assembly 119) and the atmosphere. The ambient air valve operates to allow ambient air to flow through a mesh bird screen 152 (typically wire or metal) and into the interior of the air pre-treatment assembly 119 to mix with the hot gas coming from the flare 130. If desired, the air pre-treatment assembly 119 may include a permanently open section proximate to the bleed valve which always allows some amount of bleed air into the air pre-treatment assembly 119, which may be desirable to reduce the size of the required bleed valve and for safety reasons. A pressure blower (not shown) may be connected to the inlet side of the ambient air valve, if desired, to force ambient air through the ambient air valve. If a pressure blower is implemented, the bird screen 152 and permanently open section (if implemented) may be relocated to the inlet side of the pressure blower. While the control of the ambient air or bleed valve will be discussed in greater detail hereinafter, this valve generally allows the gas from the flare 130 to be cooled to a more desirable temperature before entering into the concentrator assembly 120. The air pre-treatment assembly 119 may be supported in part by cross-members 154 connected to the support member 142. The cross-members 154 stabilize the air pre-treatment assembly 119, which is also typically made of heavy carbon or stainless steel or other metal, and which may be refractory-lined to improve energy efficiency and to withstand the high temperature of the gases within this section of the concentrator 110. If desired, the vertical piping section 150 may be extendable to adapt to or account for flares of differing heights so as to make the liquid concentrator 110 easily adaptable to many different flares or to flares of different heights and also to improve efficiency when erecting concentrators by correcting for slight vertical and/or horizontal misalignment of components. The vertical piping section 150 may include a first section 150A (shown using dotted lines) that rides inside of a second section 150B thereby allowing the vertical piping section 150 to be adjustable in length (height).

Generally speaking, the air pre-treatment assembly 119 operates to mix ambient air provided through the ambient air valve beneath the screen 152 and the hot gas flowing from the flare 130 through the heat transfer pipe 140 to create a desired temperature of gas at the inlet of the concentrator assembly 120.

The liquid concentrator assembly 120 includes a lead-in section 156 which mates the bottom of the piping section 150 to a quencher 159 of the concentrator assembly 120. The concentrator assembly 120 also includes a first fluid inlet 160, which injects new or untreated liquid to be concentrated, such as landfill leachate, into the interior of the quencher 159. While not shown in FIG. 3, the inlet 160 may include a coarse sprayer with a large nozzle for spraying the untreated liquid into the quencher 159. Because the liquid being sprayed into the quencher 159 at this point in the system is not yet concentrated, and thus has large amount of water therein, and because the sprayer is a coarse sprayer, the sprayer nozzle is not subject to fouling or being clogged by the small particles within the liquid. As will be understood, the quencher 159 operates to quickly reduce the temperature of the gas stream (e.g., from about 900 degrees Fahrenheit to less than 200 degrees Fahrenheit) while performing a high degree of evaporation on the liquid injected at the inlet 160. If desired, but not specifically shown in FIG. 2, a temperature sensor may be located at or near the exit of the piping section 150 or in the quencher 159 and may be used to control the position of the ambient air valve to thereby control the temperature of the gas present at the inlet of the concentrator assembly 120.

As shown in FIG. 2, the quencher 159 is connected to liquid injection chamber which is connected to narrowed portion or venturi section 162 which has a narrowed cross section with respect to the quencher 159 and which has a venturi plate 163 (shown in dotted line) disposed therein. The venturi plate 163 creates a narrow passage through the venturi section 162, which creates a large pressure drop between the entrance and the exit of the venturi section 162. This large pressure drop causes turbulent gas flow and shearing forces within the quencher 159 and the top or entrance of the venturi section 162, and causes a high rate of gas flow out of the venturi section 162, both of which lead to thorough mixing of the gas and liquid in the venturi section 162. The position of the venturi plate 163 may be controlled with a manual control rod (not shown) connected to the pivot point of the plate 163, or via an automatic positioner that may be driven by an electric motor or pneumatic cylinder (not shown).

A re-circulating pipe 166 extends around opposite sides of the entrance of the venturi section 162 and operates to inject partially concentrated (i.e., re-circulated) liquid into the venturi section 162 to be further concentrated and/or to prevent the formation of dry particulate within the concentrator assembly 120 through multiple fluid entrances located on one or more sides of the flow corridor. While not explicitly shown in FIG. 2, a number of pipes, such as three pipes of, for example, ½ inch diameter, may extend from each of the opposites legs of the pipe 166 partially surrounding the venturi section 162, and through the walls and into the interior of the venturi section 162. Because the liquid being ejected into the concentrator 110 at this point is re-circulated liquid, and is thus either partially concentrated or being maintained at a particular equilibrium concentration and more prone to plug a spray nozzle than the less concentrated liquid injected at the inlet 160, this liquid may be directly injected without a sprayer so as to prevent clogging. However, if desired, a baffle in the form of a flat plate may be disposed in front of each of the openings of the ½ diameter pipes to cause the liquid being injected at this point in the system to hit the baffle and disperse into the concentrator assembly 120 as smaller droplets. In any event, the configuration of this re-circulating system distributes or disperses the re-circulating liquid better within the gas stream flowing through the concentrator assembly 120.

The combined hot gas and liquid flows in a turbulent manner through the venturi section 162. As noted above, the venturi section 162, which has a moveable venturi plate 163 disposed across the width of the concentrator assembly 120, causes turbulent flow and complete mixture of the liquid and gas, causing rapid evaporation of the discontinuous liquid phase into the continuous gas phase. Because the mixing action caused by the venturi section 162 provides a high degree of evaporation, the gas cools substantially in the concentrator assembly 120, and exits the venturi section 162 into a flooded elbow 164 at high rates of speed. In one embodiment, the temperature of the gas-liquid mixture at this point may be about 160 degrees Fahrenheit.

The flooded elbow 164 may include a weir arrangement (not shown) within a bottom portion of the flooded elbow 164 that maintains a substantially constant level of partially or fully concentrated re-circulated liquid disposed therein. Droplets of re-circulated liquid that are entrained in the gas phase as the gas-liquid mixture exits the venturi section 162 at high rates of speed are thrown outward onto the surface of the re-circulated liquid held within the bottom of the flooded elbow 164 by centrifugal force generated when the gas-liquid mixture is forced to turn 90 degrees to flow into the fluid scrubber 122. Significant numbers of liquid droplets entrained within the gas phase that impinge on the surface of the re-circulated liquid held in the bottom of the flooded elbow 164 coalesce and join with the re-circulated liquid thereby increasing the volume of re-circulated liquid in the bottom of the flooded elbow 164 causing an equal amount of the re-circulated liquid to overflow the weir arrangement and flow by gravity into a sump 172 at the bottom of the fluid scrubber 122. Thus, interaction of the gas-liquid stream with the liquid within the flooded elbow 164 removes liquid droplets from the gas-liquid stream, and also prevents suspended particles within the gas-liquid stream from hitting the bottom of the flooded elbow 164 at high velocities, thereby preventing erosion of the metal that forms the portions of side walls located beneath the level of the weir arrangement and the bottom of the flooded elbow 164.

After leaving the flooded elbow 164, the gas-liquid stream in which evaporated liquid and some liquid and other particles still exist, flows through the fluid scrubber 122 which is, in this case, a cross-flow fluid scrubber. The fluid scrubber 122 includes various screens or filters which serve to remove entrained liquids and other particles from the gas-liquid stream. In one particular example, the cross flow scrubber 122 may include an initial coarse impingement baffle 169 at the input thereof, which is designed to remove liquid droplets in the range of 50 to 100 microns in size or higher. Thereafter, two removable filters in the form of chevrons 170 are disposed across the fluid path through the fluid scrubber 122, and the chevrons 170 may be progressively sized or configured to remove liquid droplets of smaller and smaller sizes, such as 20-30 microns and less than 10 microns. Of course, more or fewer filters or chevrons could be used.

Liquid captured by the filters 169 and 170 and the overflow weir arrangement within the bottom of the flooded elbow 164 drain by gravity into the reservoir or sump 172 located at the bottom of the fluid scrubber 122. The sump 172, which may hold, in some examples approximately 200 gallons of liquid, thereby collects concentrated fluid containing dissolved and suspended solids removed from the gas-liquid stream and operates as a reservoir for a source of re-circulating concentrated liquid back to the concentrator assembly 120 to be further treated and/or to prevent the formation of dry particulate within the concentrator assembly 120 in the manner described above with respect to FIG. 1. In one embodiment, the sump 172 may include a sloped V-shaped bottom 171 having a V-shaped groove 175 extending from the back of the fluid scrubber 122 (furthest away from the flooded elbow 164) to the front of the fluid scrubber 122 (closest to the flooded elbow 164), wherein the V-shaped groove 175 is sloped such that the bottom of the V-shaped groove 175 is lower at the end of the fluid scrubber 122 nearest the flooded elbow 164 than at an end farther away from the flooded elbow 164. In other words, the V-shaped bottom 171 may be sloped with the lowest point of the V-shaped bottom 171 proximate an exit port 173 and/or a pump 182. In other embodiments, the sump may have angled side walls that funnel liquid to a low point generally positioned in the center of the sump. The side walls may have various angles relative to vertical. Additionally, a washing circuit 177 (FIG. 3) may pump concentrated fluid from the sump 172 to a sprayer 179 within the cross flow scrubber 122, the sprayer 179 being aimed to spray liquid at the V-shaped bottom 171. Alternatively, the sprayer 179 may spray un-concentrated liquid or clean water at the V-shaped bottom 171. The sprayer 179 may periodically or constantly spray liquid onto the surface of the V-shaped bottom 171 to wash solids and prevent solid buildup on the V-shaped bottom 171 or at the exit port 173 and/or the pump 182. As a result of this V-shaped sloped bottom 171 and washing circuit 177, liquid collecting in the sump 172 is continuously agitated and renewed, thereby maintaining a relatively constant consistency and maintaining solids in suspension. If desired, the spraying circuit 177 may be a separate circuit using a separate pump with, for example, an inlet inside of the sump 172, or may use the pump 182 associated with a concentrated liquid re-circulating circuit described below to spray concentrated fluid from the sump 172 onto the V-shaped bottom 171.

As illustrated in FIG. 2, a return line 180, as well as the pump 182, operate to re-circulate fluid removed from the gas-liquid stream from the sump 172 back to the concentrator 120 and thereby complete a fluid or liquid re-circulating circuit. Likewise, a pump 184 may be provided within an input line 186 to pump new or untreated liquid, such as landfill leachate, to the input 160 of the concentrator assembly 120. Also, one or more sprayers may be disposed inside the fluid scrubber 122 adjacent the chevrons 170 and may be operated periodically to spray clean water or a portion of the wastewater feed on the chevrons 170 to keep them clean.

Concentrated liquid also may be removed from the bottom of the fluid scrubber 122 via the exit port 173 and may be further processed or disposed of in any suitable manner in a secondary re-circulating circuit 181. In particular, the concentrated liquid removed by the exit port 173 contains a certain amount of suspended solids, which preferably may be separated from the liquid portion of the concentrated liquid and removed from the system using the secondary re-circulating circuit 181. For example, concentrated liquid removed from the exit port 173 may be transported through the secondary re-circulating circuit 181 to one or more solid/liquid separating devices 183, such as settling tanks, vibrating screens, rotary vacuum filters, horizontal belt vacuum filters, belt presses, filter presses, and/or hydro-cyclones. After the suspended solids and liquid portion of the concentrated wastewater are separated by the solid/liquid separating device 183, the liquid portion of the concentrated wastewater with suspended particles substantially removed may be returned to the sump 172 for further processing in the first or primary re-circulating circuit connected to the concentrator.

The gas, which flows through and out of the fluid scrubber 122 with the liquid and suspended solids removed therefrom, exits out of piping or ductwork at the back of the fluid scrubber 122 (downstream of the chevrons 170) and flows through an induced draft fan 190 of the exhaust assembly 124, from where it is exhausted to the atmosphere in the form of the cooled hot inlet gas mixed with the evaporated water vapor. Of course, an induced draft fan motor 192 is connected to and operates the fan 190 to create negative pressure within the fluid scrubber 122 so as to ultimately draw gas from the flare 130 through the transfer pipe 140, the air pre-treatment assembly 119 and the concentrator assembly 120. As described above with respect to FIG. 1, the induced draft fan 190 needs only to provide a slight negative pressure within the fluid scrubber 122 to assure proper operation of the concentrator 110.

While the speed of the induced draft fan 190 can be varied by a device such as a variable frequency drive operated to create varying levels of negative pressure within the fluid scrubber 122 and thus can usually be operated within a range of gas flow capacity to assure complete gas flow from the flare 130, if the gas being produced by the flare 130 is not of sufficient quantity, the operation of the induced draft fan 190 cannot necessarily be adjusted to assure a proper pressure drop across the fluid scrubber 122 itself. That is, to operate efficiently and properly, the gas flowing through the fluid scrubber 122 must be at a sufficient (minimal) flow rate at the input of the fluid scrubber 122. Typically this requirement is controlled by keeping at least a preset minimal pressure drop across the fluid scrubber 122.

Figure 3:
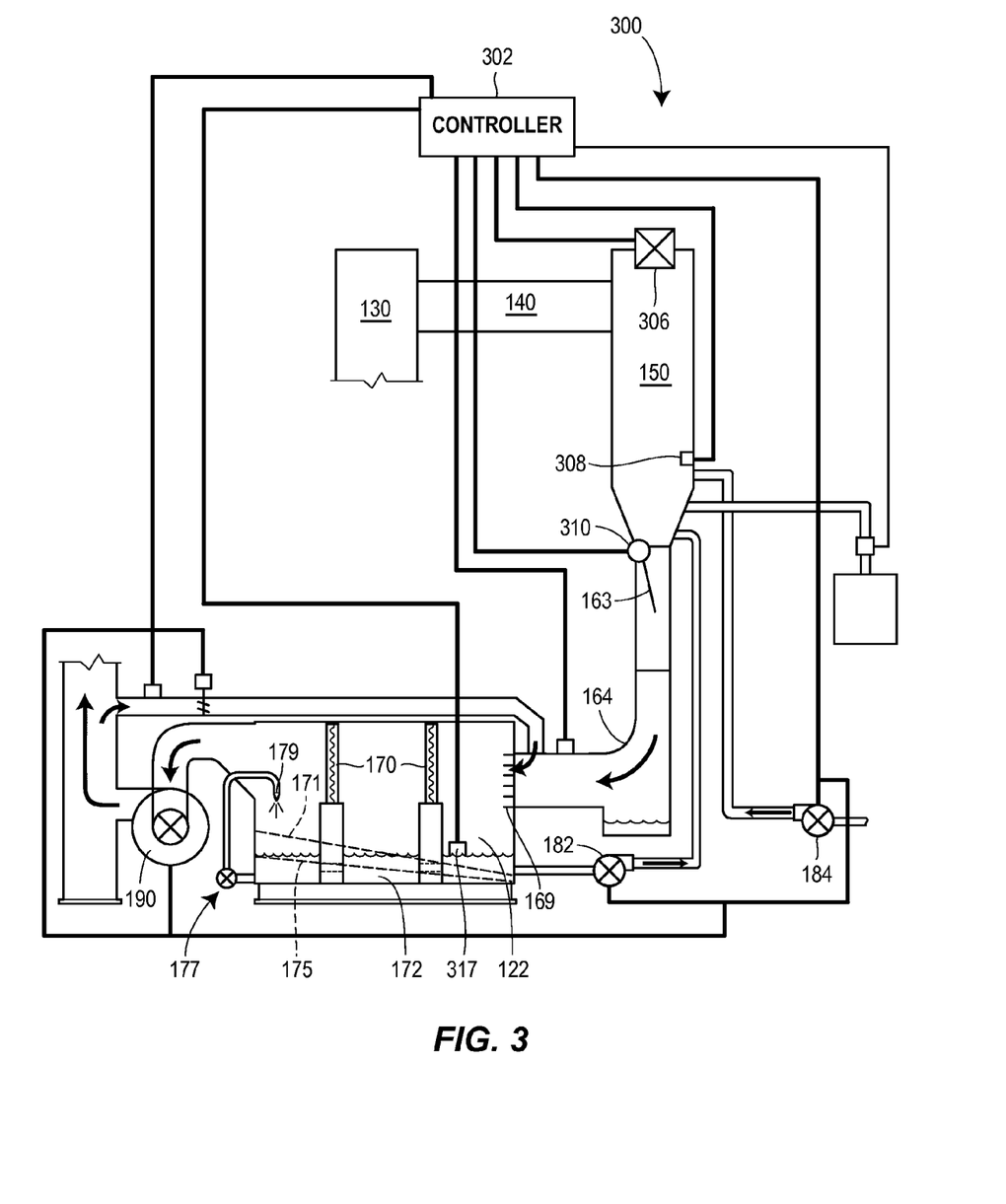
FIG. 3 is a schematic diagram of a control system which may be used in the compact liquid concentrator of FIG. 2 to control the operation of the various component parts of the compact liquid concentrator.

FIG. 3 illustrates a schematic diagram of a control system 300 that may be used to operate the concentrator 110 of FIG. 2. As illustrated in FIG. 3, the control system 300 includes a controller 302, which may be a form of digital signal processor type of controller, a programmable logic controller (PLC) which may run, for example, ladder logic based control, or any other type of controller. The controller 302 is, of course, connected to various components within the concentrator 110. For example, the controller 302 may be connected to and may control the ambient air inlet valve 306 disposed in the air pre-treatment assembly 119 of FIG. 2 upstream of the venturi section 162 and may be used to control the pumps 182 and 184 which control the amount of and the ratio of the injection of new liquid to be treated and the re-circulating liquid being treated within the concentrator 110. The controller 302 may be operatively connected to a sump level sensor 317 (e.g., a float sensor, a non-contact sensor such as a radar or sonic unit, or a differential pressure cell). The controller 302 may use a signal from the sump level sensor 317 to control the pumps 182 and 184 to maintain the level of concentrated fluid within the sump 172 at a predetermined or desired level. Also, the controller 302 may be connected to the induced draft fan 190 to control the operation of the fan 190, which may be a single speed fan, a variable speed fan or a continuously controllable speed fan. In one embodiment, the induced draft fan 190 is driven by a variable frequency motor, so that the frequency of the motor is changed to control the speed of the fan. Moreover, the controller 302 is connected to a temperature sensor 308 disposed at, for example, the inlet of the concentrator assembly 120 or at the inlet of the venturi section 162, and receives a temperature signal generated by the temperature sensor 308. The temperature sensor 308 may alternatively be located downstream of the venturi section 162 or the temperature sensor 308 may include a pressure sensor for generating a pressure signal.

During operation and at, for example, the initiation of the concentrator 110, when the flare 130 is actually running and is thus burning landfill gas, the controller 302 may first turn on the induced draft fan 190 to create a negative pressure within the fluid scrubber 122 and the concentrator assembly 120. Based on the temperature signal from the temperature sensor 308, the controller 302 may control the ambient air valve 306 (typically by closing this valve partially or completely) to control the temperature of the gas at the inlet of the concentrator assembly 120. Generally speaking, the ambient air valve 306 may be biased in a fully open position (i.e., may be normally open) by a biasing element such as a spring, and the controller 302 may begin to close the valve 306 to control the amount of ambient air that is diverted into the air pre-treatment assembly 119 (due to the negative pressure in the air pre-treatment assembly 119), so as to cause the mixture of the ambient air and the hot gases from the flare 130 to reach a desired temperature. The controller 302 may operate the speed of the induced draft fan 190, to control the amount of gas that enters the air pre-treatment assembly 119 from the flare 130. As will be understood, the amount of gas flowing through the concentrator 110 may need to vary depending on ambient air temperature and humidity, the temperature of the flare gas, the amount of gas exiting the flare 130, etc. The controller 302 may therefore control the temperature and the amount of gas flowing through the concentrator assembly 120 by controlling the ambient air control valve 306 and the speed of the induced draft fan 190 based on, for example, the measurement of the temperature sensor 308 at the inlet of the concentrator assembly 120. This feedback system is desirable because, in many cases, the air coming out of a flare 130 is between 1200 and 1800 degrees Fahrenheit, which may be too hot, or hotter than required for the concentrator 110 to operate efficiently and effectively.

In any event, as illustrated in FIG. 3, the controller 302 may also be connected to a motor 310 which drives or controls the position of the venturi plate 163 within the narrowed portion of the concentrator assembly 120 to control the amount of turbulence caused within the concentrator assembly 120. Still further, the controller 302 may control the operation of the pumps 182 and 184 to control the rate at which (and the ratio at which) the pumps 182 and 184 provide re-circulating liquid and new waste fluid to be treated to the inputs of the quencher 159 and the venturi section 162. In one embodiment, the controller 302 may control the ratio of the re-circulating fluid to new fluid to be about 10:1, so that if the pump 184 is providing 8 gallons per minute of new liquid to the input 160, the re-circulating pump 182 is pumping 80 gallons per minute. Additionally, or alternatively, the controller 302 may control the flow of new liquid to be processed into the concentrator (via the pump 184) by maintaining a constant or predetermined level of concentrated liquid in the sump 172 using, for example, the level sensor 317. Of course, the amount of liquid in the sump 172 will be dependent on the rate of concentration in the concentrator, the rate at which concentrated liquid is pumped from or otherwise exists the sump 172 via the secondary re-circulating circuit and the rate at which liquid from the secondary re-circulating circuit is provided back to the sump 172, as well as the rate at which the pump 182 pumps liquid from the sump 172 for delivery to the concentrator via the primary re-circulating circuit.

If desired, the ambient air valve 306 may be operated in a fail-safe open position, such that the ambient air valve 306 opens in the case of a failure of the system (e.g., a loss of control signal) or a shutdown of the concentrator 110. The ambient air valve 306 may be spring biased or otherwise configured to open upon shut down of the concentrator 110 or loss of signal to the valve 306. This operation causes quick cooling of the air pre-treatment assembly 119 and the concentrator assembly 120. Moreover, because of the quick opening nature of the ambient air valve 306, the controller 302 can quickly shut down the concentrator 110 without having to turn off or effect the operation of the flare 130.

Furthermore, as illustrated in the FIG. 3, the controller 302 may be connected to the venturi plate motor 310 or other actuator which moves or actuates the angle at which the venturi plate 163 is disposed within the venturi section 162. Using the motor 310, the controller 302 may change the angle of the venturi plate 163 to alter the gas flow through the concentrator assembly 120, thereby changing the nature of the turbulent flow of the gas through concentrator assembly 120, which may provide for better mixing of the and liquid and gas therein and obtain better or more complete evaporation of the liquid. In this case, the controller 302 may operate the speed of the pumps 182 and 184 in conjunction with the operation of the venturi plate 163 to provide for optimal concentration of the wastewater being treated. Thus, as will be understood, the controller 302 may coordinate the position of the venturi plate 163 with the operation of the position of the ambient air or bleed valve 306 and the speed of the induction fan 190 to maximize wastewater concentration (turbulent mixing) without fully drying the wastewater so as to prevent formation of dry particulates. The controller 302 may use pressure inputs from the pressure sensors to position the venturi plate 163. Of course, the venturi plate 163 may be manually controlled or automatically controlled.

Thus, as will be understood from the above discussion, the controller 302 may implement one or more on/off control loops used to start up or shut down the concentrator 110 without affecting the operation of the flare 130. For example, the controller 302 may implement a bleed valve control loop which opens or begins to close the ambient air valve 306 and an induced draft fan control loop which starts or stops the induced draft fan 190 based on whether the concentrator 110 is being started or stopped. Moreover, during operation, the controller 302 may implement one or more on-line control loops which may control various elements of the concentrator 110 individually or in conjunction with one another to provide for better or optimal concentration. When implementing these on-line control loops, the controller 302 may control the speed of induced draft fan 190, the position or angle of the venturi plate 163, and/or the position of the ambient air valve 306 to control the fluid flow through the concentrator 110, and/or the temperature of the air at the inlet of the concentrator assembly 120 based on signals from the temperature and pressure sensors. Moreover, the controller 302 may maintain the performance of the concentration process at steady-state conditions by controlling the pumps 184 and 182 which pump new and re-circulating fluid to be concentrated into the concentrator assembly 120. Of course, while the controller 302 is illustrated in FIG. 3 as a single controller device that implements these various control loops, the controller 302 could be implemented as multiple different control devices by, for example, using multiple different PLCs.

As will be understood, the concentrator 110 described herein directly utilizes hot waste gases in processes after the gases have been thoroughly treated to meet emission standards, and so seamlessly separates the operational requirements of the process that generates the waste heat from the process which utilizes the waste heat in a simple, reliable and effective manner.

Figure 4:
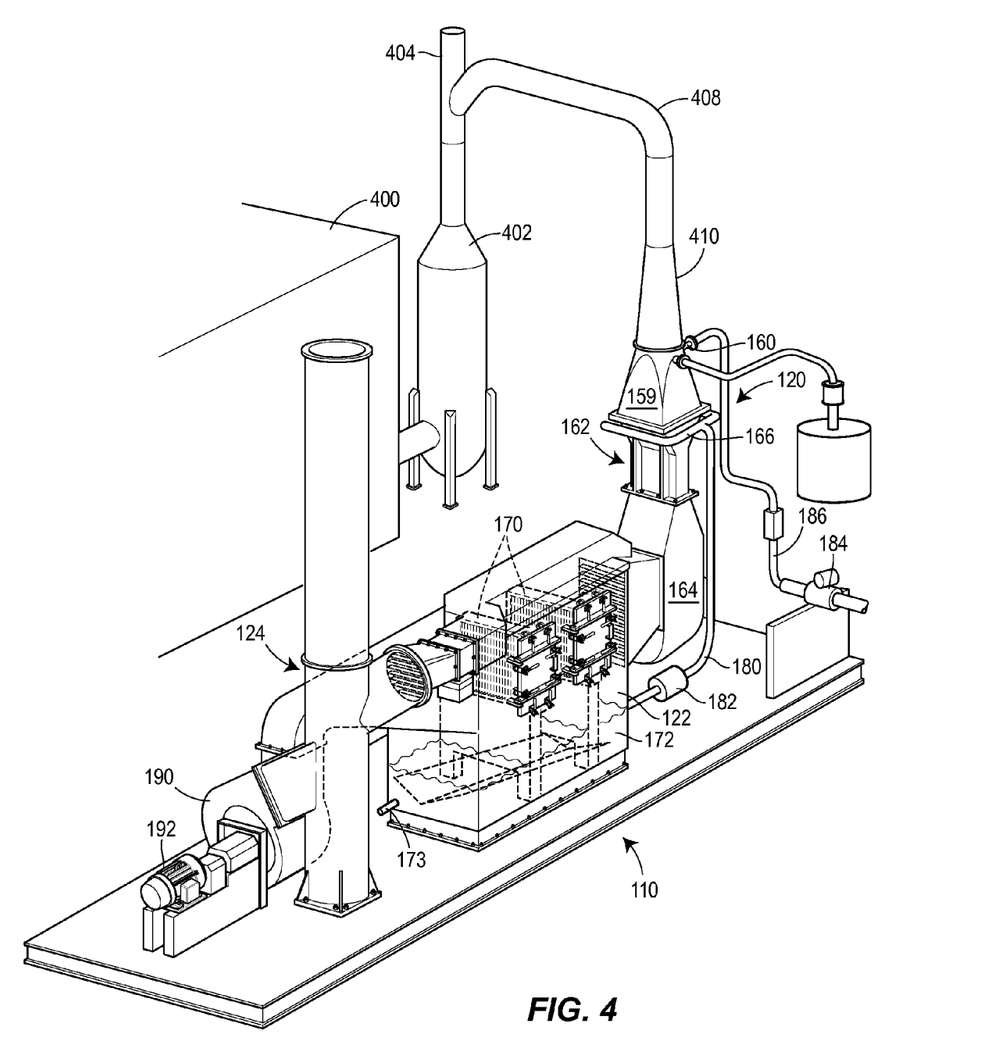
FIG. 4 is a perspective view of the compact liquid concentrator of FIG. 2 attached to a combustion engine stack as a source of waste heat.
Figure 5:
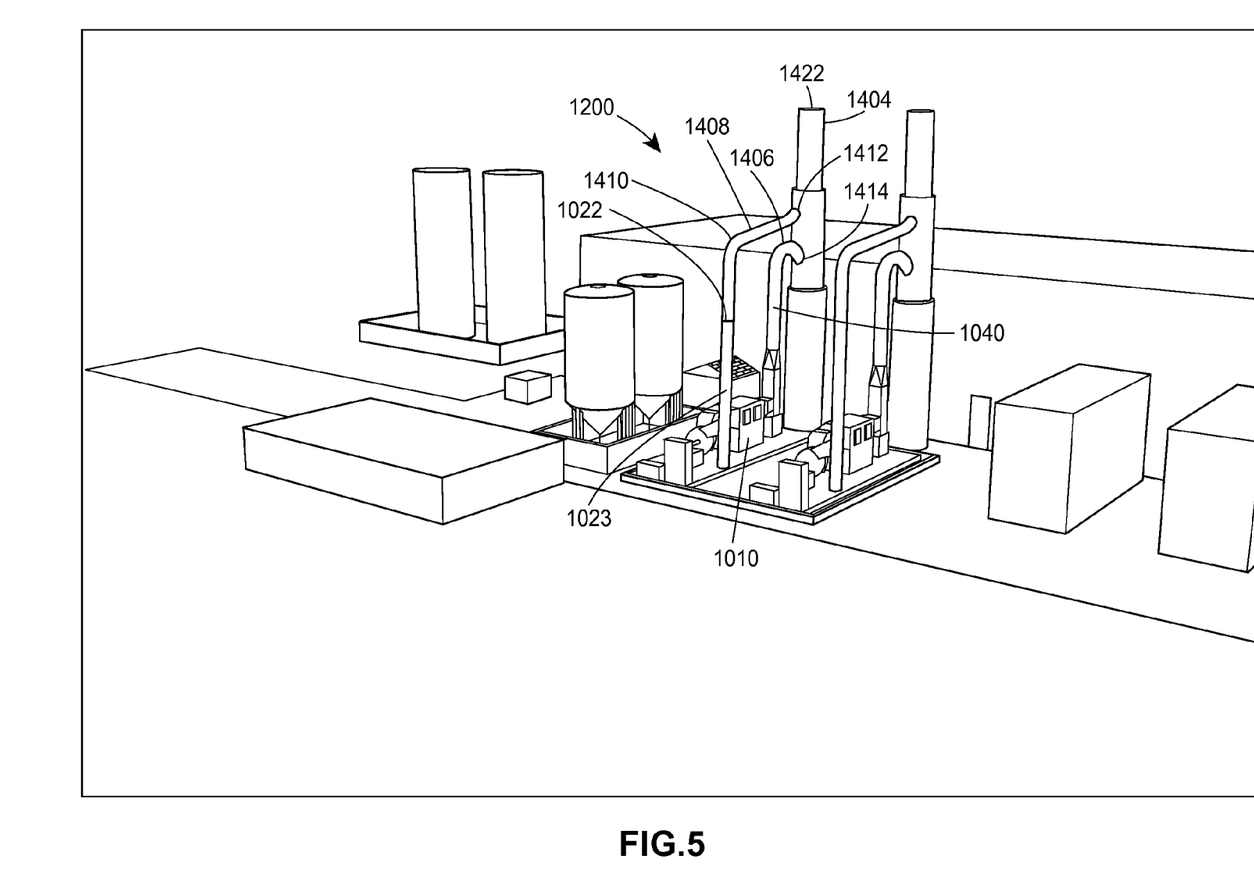
FIGS. 5-8 are perspective and plan views of an exhaust stack plume mitigation system connected to one embodiment of a compact liquid concentrator.
Figure 6:
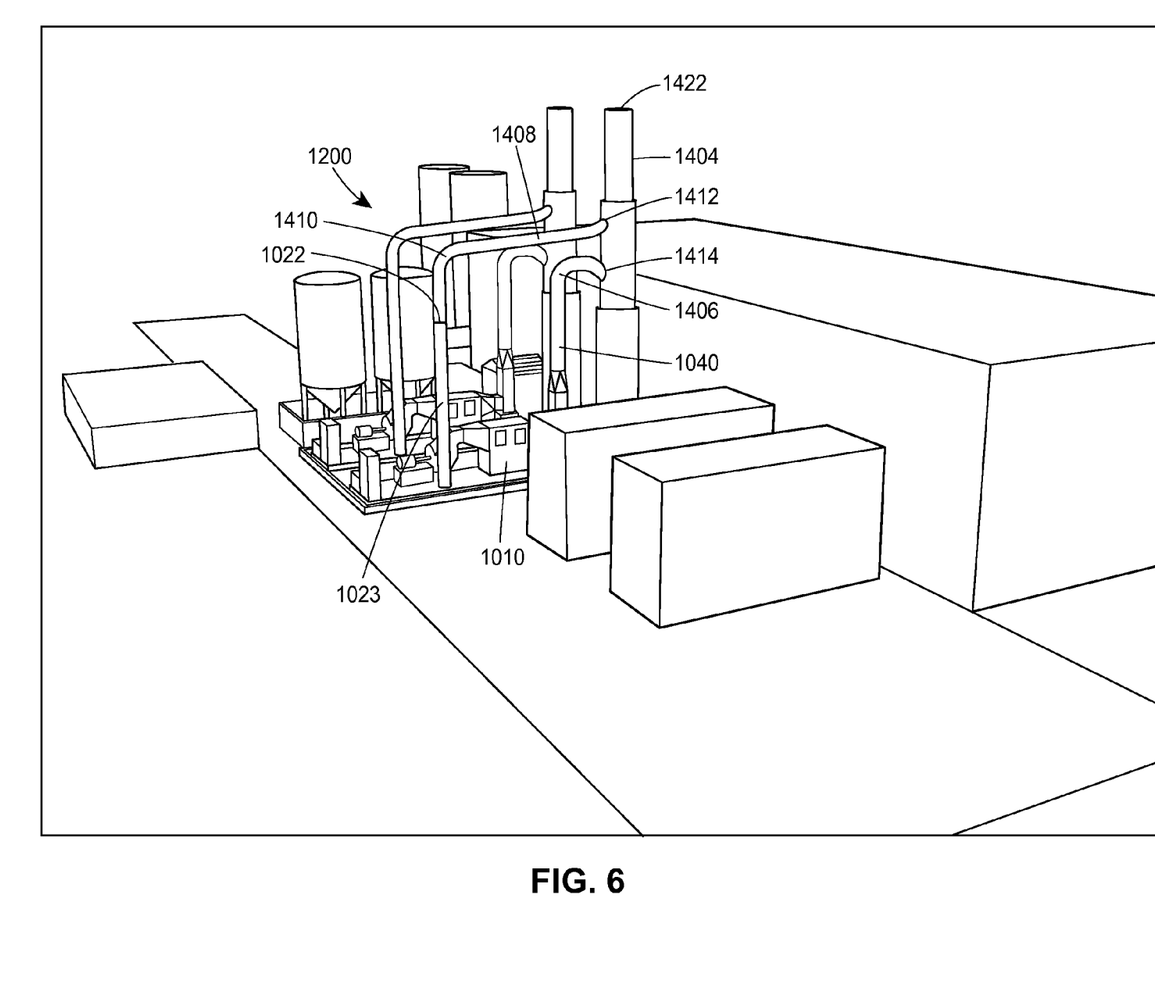
Figure 7:
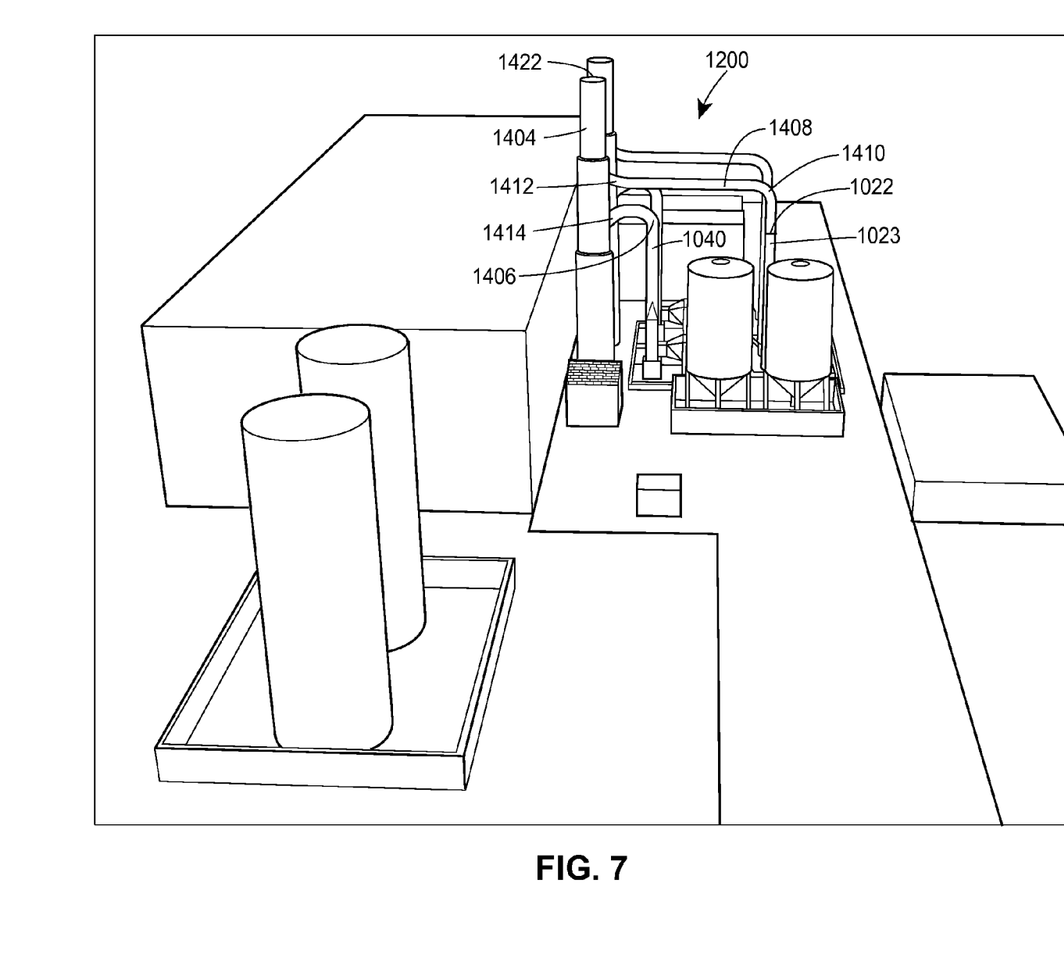
Figure 8:
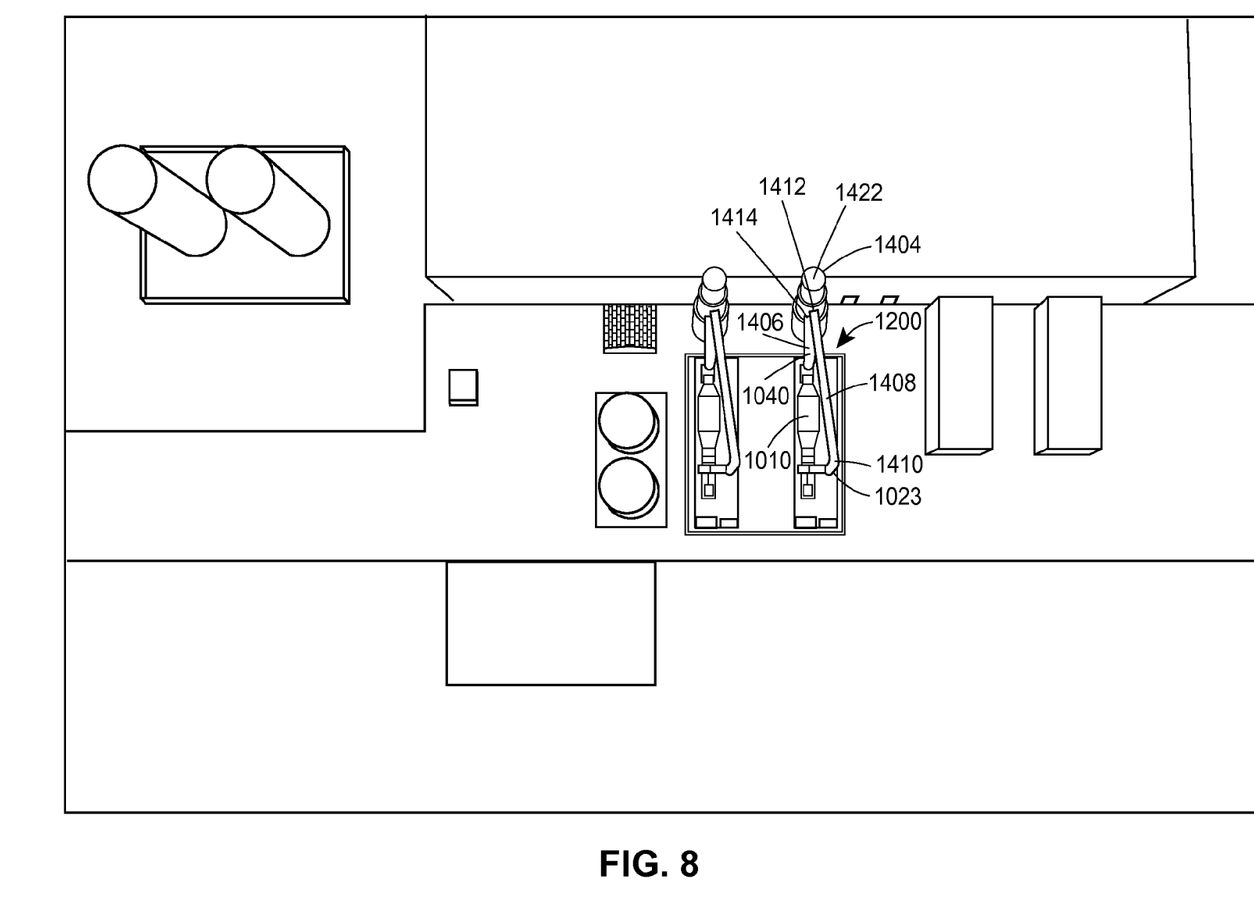

While the liquid concentrator 110 has been described above as being connected to a landfill flare to use the waste heat generated in the landfill flare, the liquid concentrator 110 can be easily connected to other sources of waste heat. For example, FIG. 4 illustrates the concentrator 110 modified so as to be connected to an exhaust stack of a combustion engine plant 400 (FIG. 4) and to use the waste heat from the engine exhaust to perform liquid concentration. While, in one embodiment, the engine within the plant 400 may operate on landfill gas to produce electricity, the concentrator 110 can be connected to run with exhaust from other types of engines, including other types of combustion engines, such as those that operate on gasoline, diesel fuel, etc.

Referring to FIG. 4, exhaust generated in an engine (not shown) within the plant 400 is provided to a muffler 402 on the exterior of the plant 400 and, from there, enters into a combustion gas exhaust stack 404. In this case, a Y-connector is provided within the exhaust stack 404 and operates to connect the stack 404 to a transfer pipe 408 which transfers exhaust gas (a source of waste heat) from the engine to an expander section 410. The expander section 410 mates with the quencher 159 of the concentrator 110 and provides the exhaust gas from the engine directly to the concentrator assembly 120 of the concentrator 110. It is typically not necessary to include an air bleed valve upstream of the concentrator section 120 when using engine exhaust as a source of waste heat because exhaust gas typically leaves an engine at less than 900 degrees Fahrenheit, and so does not need to be cooled significantly before entering the quencher 159. The remaining parts of the concentrator 110 remain the same as described above with respect to FIGS. 1-3. As a result, it can be seen that the liquid concentrator 110 can be easily adapted to use various different sources of waste heat without a lot of modification.

While the liquid concentrators described above efficiently concentrate wastewater streams, moisture laden exhaust from the liquid concentrator may condense upon exiting the liquid concentrator to form condensation plumes. Reducing or otherwise mitigating these condensation plumes may be desirable.

Two primary methods exist for mitigating condensation plume formation from exhaust stacks. The first method includes dumping moisture rich exhaust gas from a first exhaust stack (e.g. a liquid concentrator exhaust stack) into a second exhaust stack (e.g., an engine or generator exhaust stack) that has higher temperature and drier exhaust gas. In this first method, the original moisture rich exhaust gas is both heated and diluted by the higher temperature exhaust gas in the second exhaust stack.

The second method includes introducing additional heat, in the form of higher temperature exhaust gas or supplemental flare gases, for example, into the primary exhaust stack (e.g., the liquid concentrator exhaust stack) before the exhaust gases exit the primary exhaust stack. Again, the primary exhaust gas is both heated and diluted by the additional exhaust gas.

Both condensation plume mitigation methods result in reduced condensation plume formation at the exhaust gas exit because the relative humidity of the exhaust gas is reduced and because the temperature of the exhaust gas is increased, which results in a longer time for the exhaust gas to cool to saturation temperatures, thereby giving the exhaust gas more time to disperse into the atmosphere before a plume can form.

FIGS. 5-8 illustrate one embodiment of a plume mitigation system 1200 connected to a concentrator 1010 and an exhaust stack 1404. In certain operations, engines or generators are used to generate power. For example a landfill may use engines or generators that run on landfill gas to generate electrical power that may be used to run the landfill operation, or that may be sold to a power provider for down line use. The engines or generators are connected to one or more exhaust stacks 1404 to vent exhaust gases to the atmosphere. As discussed above, these exhaust gases are rich in heat energy as the exhaust gases are often held at temperatures above 1000 degrees F. (i.e., 1000 degrees F. to about 1800 degrees F.) in accordance with EPA regulations. Some of this heat energy may be used to concentrate industrial wastewater, such as landfill leachate for example, in the liquid concentrator 1010, as described above. In other embodiments, flare stacks may burn landfill gas or natural gas and waste heat from these flare stacks may be used to concentrate other sources of wastewater.

In the embodiment of FIGS. 5-8, the illustrated plume mitigation system 1200 employs the first method of plume mitigation discussed above, where the exhaust gas from the concentrator 1010 is dumped back into the engine or generator exhaust stack 1404. Generally, waste heat from the exhaust stack 1404 is directed into the concentrator 1010 through a primary transfer pipe 1040 that is fluidly connected to the exhaust stack 1404 with an elbow 1406 at a primary transfer point 1414 at one end of the primary transfer pipe 1040 and to an inlet of the concentrator 1010 at the other end of the primary transfer pipe 1040 so that the waste heat may be used to evaporate wastewater. The elbow 1406 may change a flow direction of the exhaust gas from a primarily horizontal direction to a primarily vertical direction. In other embodiments, the elbow 1406 may be eliminated and the exhaust gas may flow in a primarily horizontal direction from the exhaust stack 1404 to the concentrator 1010 or the exhaust gas may flow in a primarily vertical direction from the exhaust stack 1404 to the concentrator 1010.

In the embodiment illustrated in FIGS. 5-8, the concentrator 1010 only requires heat from a portion of the total exhaust gas within the exhaust stack 1404 to power the concentration process. For example, heat requirements of the concentrator 1010 may require the use of less than half of the exhaust gas exiting the exhaust stack 1404 to be diverted to the concentrator. Although this embodiment uses a "T" or "Y" connection between the primary transfer pipe 1040 and the engine or generator exhaust stack 1404, other embodiments may employ a stack bustle (not shown) between the primary transfer pipe 1040 and the exhaust stack 1404 to divert exhaust gases from the exhaust stack 1404 in a way that does not disrupt the flow pattern within the exhaust stack 1404. Such stack bustles would not significantly change flow characteristics of the exhaust gas remaining in the exhaust stack 1404 and as a result, the addition of such stack bustles would not alter any EPA certifications. More particularly, the flow pattern within the engine or generator exhaust stack 1404 would not be disrupted by the transfer of exhaust gas through the stack bustle and primary transfer tube 1040. One example of such a stack bustle may be found in U.S. Pat. No. 7,442,035, which is hereby incorporated by reference.

After the exhaust gas has passed through the concentrator 1010 and has been used to evaporate a liquid portion of the wastewater in the concentrator 1010 in any of the manners described above, the now moisture rich exhaust gas is vented from the concentrator 1010 through a concentrator exhaust stack 1023. In the concentrator embodiments described above, the concentrator exhaust is simply vented to the atmosphere through a gas exit 22 (FIG. 1), for example. The plume mitigation system 1200, however, directs the concentrator exhaust gas from the concentrator exhaust stack 1023 back to the exhaust stack 1404 through a return pipe 1408. The return pipe may include an elbow 1410 that changes the flow direction of the concentrator exhaust gas from a primarily vertical direction to a primarily horizontal direction until the concentrator exhaust gas is dumped into the exhaust stack 1404 at an exhaust return point 1412, which is downstream (e.g., above in FIGS. 5-8) of the primary transfer point 1414. In other words, the return point 1412 is located between the gas exit 1422 and the primary transfer pipe 1040 along the exhaust stack 1404. The plume mitigation system 1200 may employ a stack bustle (as described above with respect to the primary transfer pipe 1040) at the return point 1412 as well to prevent disruption of flow patterns in the exhaust stack 1404. In this case, the stack bustle, if configured as described in U.S. Pat. No. 7,442,035, would be oriented up-side down with respect to the manner illustrated in U.S. Pat. No. 7,442,035. Moreover, a stack bustle at the return point 1412 configured in this manner would operate to disperse the concentrator exhaust approximately evenly about a circumference of the exhaust stack 1404, resulting in more complete mixing of the concentrator exhaust and the engine or generator exhaust.

The concentrator exhaust gas in the concentrator exhaust stack 1023 exits the concentrator exhaust stack 1023 through a gas exit 1022 at a temperature between approximately 150 degrees F. and approximately 180 degrees F. The concentrator exhaust is within approximately 5 degrees F. or less of its adiabatic saturation temperature. As a result, the temperature of the concentrator exhaust remains relatively constant within the return pipe 1408. When the concentrator exhaust at temperatures of 150 degrees F. to 180 degrees F. enters the exhaust stack 1404, the concentrator exhaust is exposed to hot (over 1000 degrees F., and often over 1400 degrees F.) exhaust gas from the engine or generator. The hot exhaust gas heats the concentrator exhaust and dilutes the moisture in the concentrator exhaust. As a result, the mixed concentrator exhaust and engine or generator exhaust has a lower relative humidity than the concentrator exhaust alone. Moreover, the temperature of the mixed concentrator exhaust and engine or generator exhaust is elevated safely above any saturation temperature for moisture or other chemicals suspended in the combined concentrator exhaust and engine or generator exhaust. Therefore, moisture and other chemicals are less likely to condense and form a plume when exiting the gas exit 1422 into the atmosphere.

Figure 9:
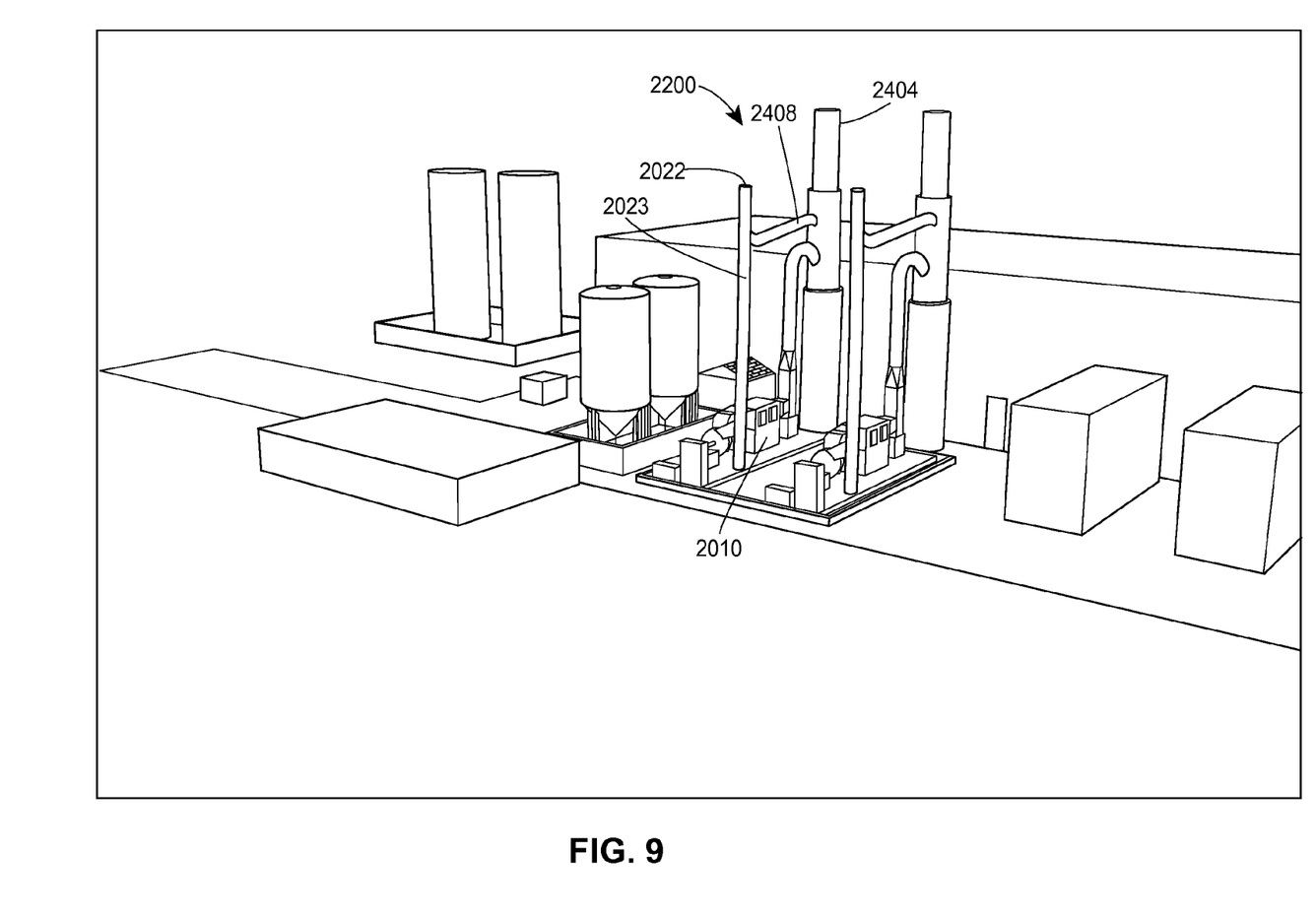
FIG. 9 is a perspective view of an alternate embodiment of an exhaust stack plume mitigation system.

FIG. 9 illustrates an alternate embodiment of a plume mitigation system 2200 that employs the second method of mitigating an exhaust plume, i.e., adding heat, by adding hot exhaust gas, for example, to a concentrator exhaust stack 2023. In this embodiment, a concentrator 2010 uses wastes heat from an engine or generator exhaust stack 2404, as in the previous embodiment. However, in the embodiment of FIG. 9, hot engine or generator exhaust gas is also added to the concentrator exhaust stack 2023 through a secondary transfer pipe 2408. The exhaust gas flow in the secondary transfer pipe 2408 flows from the engine or generator exhaust stack 2404 to the concentrator exhaust stack 2023, which is opposite of the flow direction in the return pipe 1408 in the embodiment of FIGS. 5-8. The hot exhaust gas from the engine or generator exhaust stack 2404 mixes with the cooler concentrator exhaust gas in the concentrator exhaust stack 2023 before the exhaust gases exit through the gas exit 2022 to the atmosphere. As in the previous embodiment, the hot engine or generator exhaust gas both heats and dilutes the moisture rich concentrator exhaust gas. Thus, a condensation plume is less likely to form at the gas exit 2022.

Figure 10:
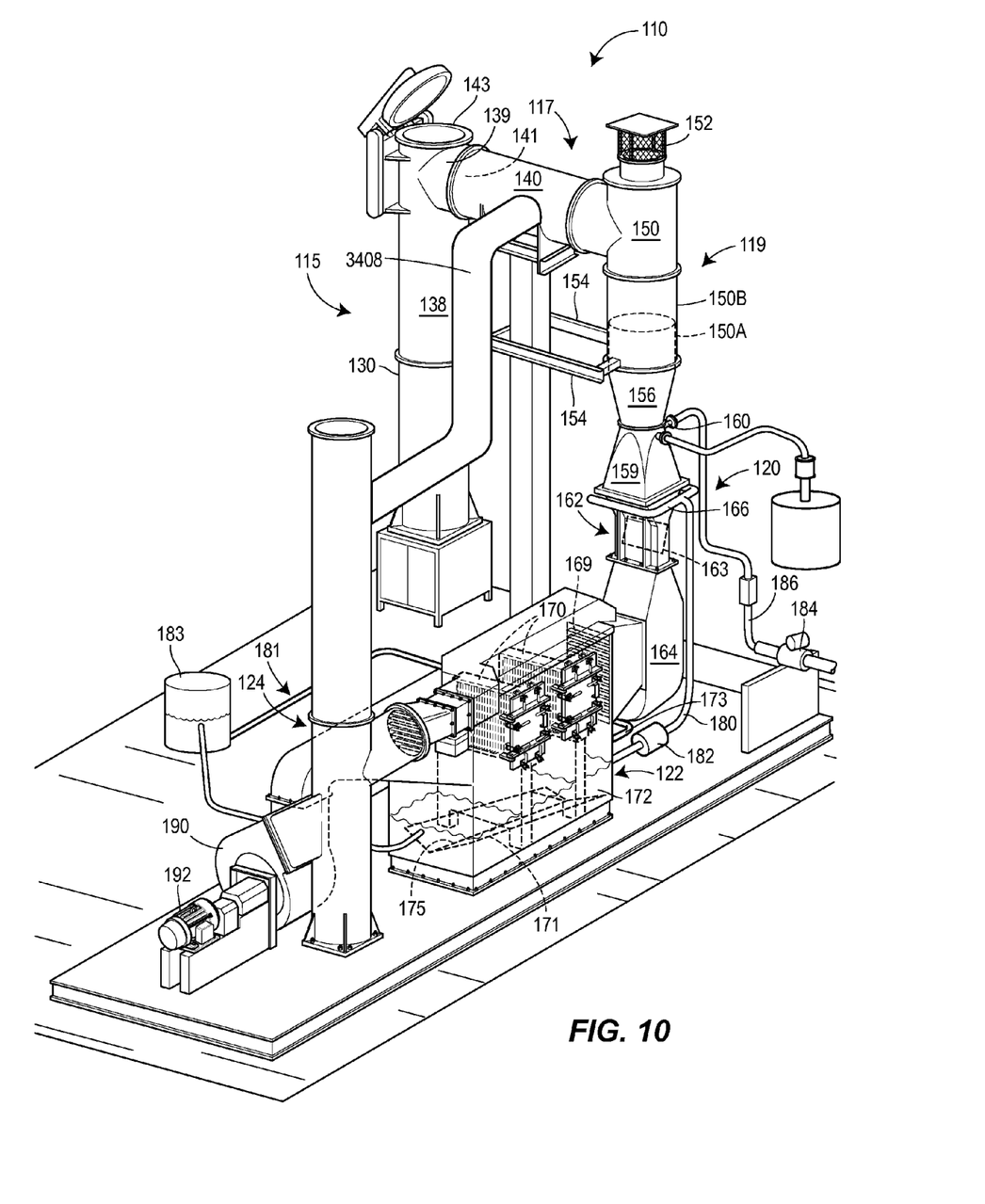
FIG. 10 is a perspective view of yet another alternate embodiment of an exhaust stack plume mitigation system.

FIG. 10 illustrates yet another alternate embodiment of a plume mitigation system installed on the concentrator embodiment of FIG. 2. In this alternate embodiment, the exhaust gases that flow through the transfer pipe 140 may be split off into an alternate transfer pipe 3408, which delivers a portion of the flare exhaust to the concentrator exhaust stack to mitigate plume formation as described above.

In yet another alternate embodiment (not shown), additional heat may be added to the concentrator exhaust by removing exhaust gas from a separate flare, or by locating a flare within the concentrator exhaust stack. The flare may burn renewable gas, such as landfill gas, that is not consumed by the engines or generators. Burning landfill gas that would otherwise be released to the atmosphere reduces greenhouse gas emissions of the landfill.

In yet another alternate embodiment (not shown), additional heat may be added to the concentrator exhaust by incorporating a dedicated flare. The dedicated flare may burn a renewable fuel source, such as landfill gas, ethanol, wood, etc. The dedicated flare may also burn non-renewable fuel, such as petroleum.

In addition to reducing the likelihood of condensation plumes forming in exhaust gases, the disclosed plume mitigation systems may allow the use of smaller or shorter exhaust stacks and/or better exhaust gas dispersion at lower elevations.

While certain representative embodiments and details have been shown for purposes of illustrating the invention, it will be apparent to those skilled in the art that various changes in the methods and apparatus disclosed herein may be made without departing from the scope of the invention.

The invention claimed is:

1. A plume mitigation system for a wastewater concentrator, the plume mitigation system comprising:
   a primary transfer pipe at all times during operation fluidly connected to an exhaust stack, the primary transfer pipe diverting a portion, but not all, of exhaust gas flowing through the exhaust stack to the wastewater concentrator; and
   a return pipe fluidly connected to the concentrator and to the exhaust stack, the return pipe directing a moisture rich gas flow from the concentrator to the exhaust stack,
   wherein the primary transfer pipe is fluidly connected to the exhaust stack at a first location and the return pipe is fluidly connected to the exhaust stack at a second location, the second location being downstream of the first location in a direction of gas flow through the exhaust stack, and
   wherein moisture rich gas exiting the concentrator is mixed with exhaust gas in the exhaust stack, thereby effectively lowering a relative humidity of the moisture rich gas, which makes the combined exhaust gas and moisture rich gas less likely to form a condensation plume upon exiting the exhaust stack to the atmosphere.

2. The plume mitigation system of claim 1, further comprising a stack bustle disposed about the exhaust stack, the stack bustle being fluidly connected to the primary transfer pipe, wherein the stack bustle diverts a portion, but not all, of exhaust gas flowing through the exhaust stack to the primary transfer pipe without substantially disrupting a gas flow pattern within the exhaust stack.

3. The plume mitigation system of claim 1, further comprising a first elbow in the primary transfer pipe.

4. The plume mitigation system of claim 3, wherein the first elbow changes a gas flow direction from primarily horizontal to primarily vertical.

5. The plume mitigation system of claim 3, further comprising a second elbow in the return pipe.

6. The plume mitigation system of claim 5, wherein the second elbow changes a gas flow direction from primarily vertical to primarily horizontal.

7. The plume mitigation system of claim 1, wherein gas flowing through the exhaust stack has a temperature of approximately 1000° F. to approximately 1800° F.

8. The plume mitigation system of claim 1, wherein the moisture rich gas from the concentrator mixes with exhaust gas in the exhaust stack, and the mixed gas has a lower relative humidity than the moisture rich gas alone so that the combined gas exiting the exhaust stack is less likely to condense into a plume that the moisture rich gas alone.

9. The plume mitigation system of claim 1, wherein the moisture rich gas flowing through the return pipe is within approximately 5° F. of its adiabatic saturation temperature.

10. The plume mitigation system of claim 1, wherein the moisture rich gas flowing through the return pipe is between approximately 150° F. and approximately 180° F.

11. The plume mitigation system of claim 1, wherein the portion of exhaust gas flowing through the exhaust stack that is diverted to the wastewater concentrator is less than 50% of the gas flowing through the exhaust stack.

12. A plume mitigation system for a wastewater concentrator, the plume mitigation system comprising:
   a primary transfer pipe at all times during operation fluidly connected to an exhaust stack, the primary transfer pipe diverting a first portion, but not all, of exhaust gas flowing through the exhaust stack to the wastewater concentrator; and a secondary transfer pipe fluidly connecting a concentrator exhaust stack to the exhaust stack, the secondary transfer pipe directing a second portion, but not all, of exhaust gas flowing through the exhaust stack to the concentrator exhaust stack, wherein the primary transfer pipe is fluidly connected to the exhaust stack at a first location and the secondary transfer pipe is fluidly connected to the exhaust stack at a second location, the second location being downstream of the first location in a direction of gas flow through the exhaust stack, and wherein the second portion of exhaust gas is mixed with the first portion of exhaust gas exiting the concentrator through the concentrator exhaust stack, thereby effectively lowering a relative humidity of the first portion of exhaust gas, which makes the combined first portion of exhaust gas and second portion of exhaust gas less likely to form a condensation plume upon exiting the concentrator to the atmosphere.

13. The plume mitigation system of claim 12, wherein the exhaust gas is diverted to the wastewater concentrator from the exhaust stack without disrupting the flow pattern within the exhaust stack.

\* \* \* \* \*